Oct. 23, 1956  E. BÜHRER  2,767,447
MEANS FOR GRIPPING AND WITHDRAWING MOULDING
FLASKS FROM MOULDING MACHINES
Filed Feb. 24, 1953  2 Sheets-Sheet 1
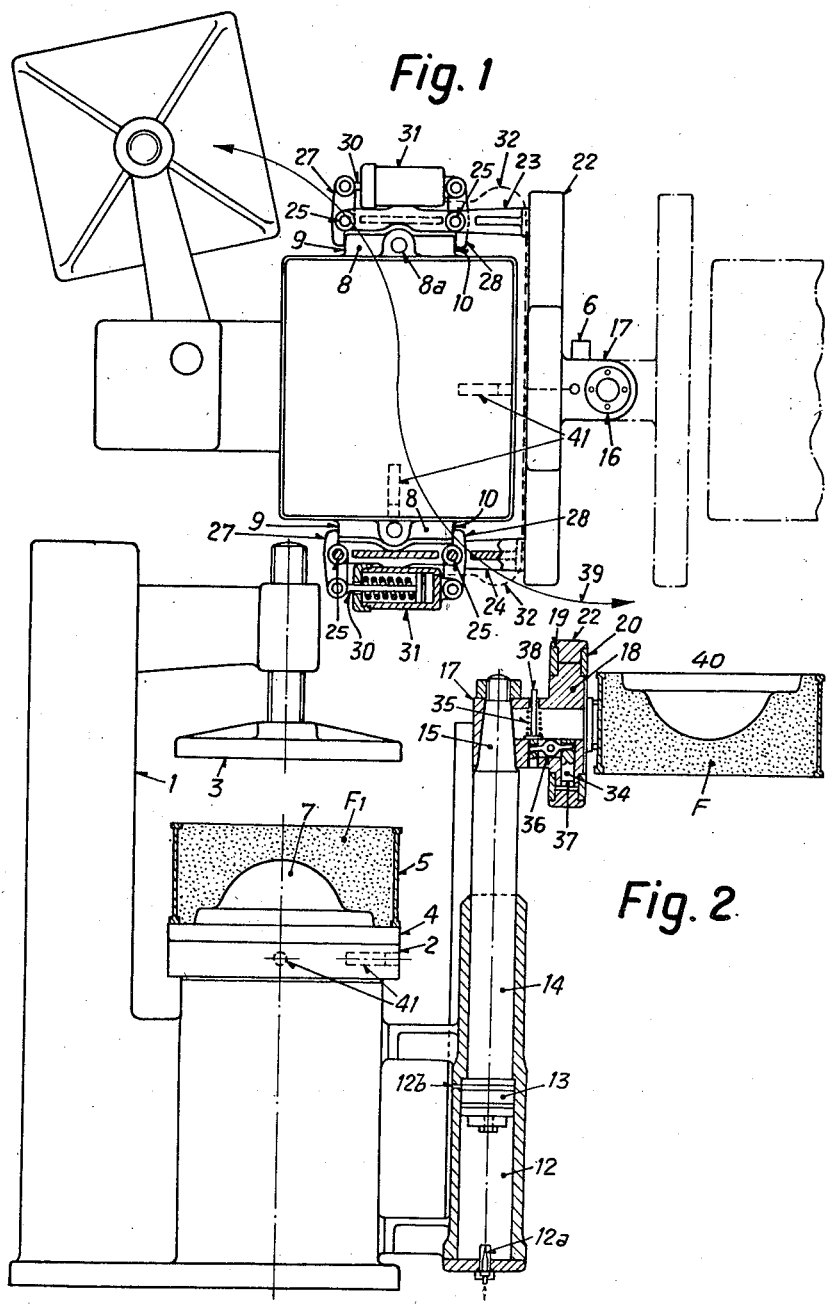
INVENTOR:
ERWIN BÜHRER Oct. 23, 1956  E. BÜHRER  2,767,447
MEANS FOR GRIPPING AND WITHDRAWING MOULDING
FLASKS FROM MOULDING MACHINES
Filed Feb. 24, 1953  2 Sheets-Sheet 2
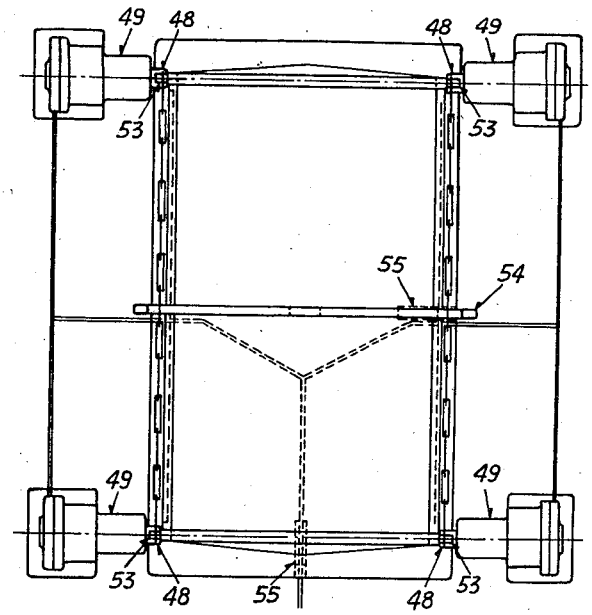
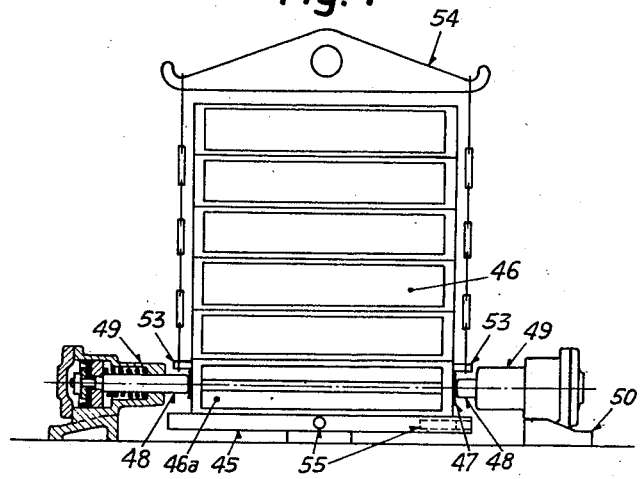
INVENTOR:
ERWIN BÜHRER

United States Patent Office 2,767,447
Patented Oct. 23, 1956

2,767,447

MEANS FOR GRIPPING AND WITHDRAWING MOULDING FLASKS FROM MOULDING MACHINES

Erwin Bührer, Schaffhausen, Switzerland

Application February 24, 1953, Serial No. 338,503

Claims priority, application Switzerland February 25, 1952

13 Claims. (Cl. 22—48)

The present invention relates to a method of securing a mold or the moulding flask against displacement during stripping or separation of the mould from the pattern.

After ramming-up or compacting granular material in moulds, either the pattern is separated from the mould or the mould from the pattern. It is of utmost importance in this connection that at the initiation and during the first part of the stripping or separation operation the mould should be withdrawn in a direction perpendicular to the plane of the mould from the position in which it was formed, without any tilting movements or lateral pressures occurring in the direction of the plane of the mould. The higher (i. e., deeper) the patterns are and the less taper they have, the more important is the aforesaid requirement, since the circumstances described are capable of producing great drawbacks owing to the fact that parts of the mould may be broken off, i. e., the mould may be damaged, during the stripping operation. The tilting movements and lateral forces however, produce changes in the surface of the mould, with the result that the latter is no longer true to the pattern, a condition which causes discrepancies of wall thickness, etc. Hitherto it has been the most widespread practice to use lifting pins or lifting frames which engage below the moulding flask or with projecting parts of the moulding flask and draw up the mould or hold it steady if the pattern assembly lowers. It is also possible, however, to turn over the pattern assembly together with the formed mould, whereupon the pattern assembly is drawn out of the mould, which latter rests on a support or mould platform. In any case it is necessary to brace the moulding flask when stripping (mould or pattern drawing) takes place. Under known operating conditions it is impossible to prevent the moulding flasks from being mechanically damaged or skewing, or sand from being entrapped between the moulding flask and the mould platform or between the moulding flask and the flask-lift mechanism. These circumstances, and others, provoke tilting movements and lateral pressures at the beginning of and during the stripping operation. It was attempted to overcome these difficulties by rectifying the sides of the moulding flasks from time to time.

It has also been proposed to use four lateral, hand-actuated arms arranged to swing in or be pushed in, said arms being provided with bevelled faces engaging below projections of the moulding flask. This method of flask-lifting is, however, too time-wasting and too highly dependent on reliable handling to be satisfactory.

The present invention relates to a novel method which overcomes the drawbacks hitherto experienced and is characterized by the fact that a number of clamps are applied to faces of the moulding flask, said clamps being so designed and so controlled by a common source of power that they apply themselves to the moulding flask in such a manner as not to cause any change in the position of the latter, and further that the clamps are so distributed that, upon an increase of the application force, gripping of the flask occurs without twisting or tilting.

To carry out this method a moulding apparatus is used which is characterized by the fact that on at least two opposite machined side faces of the moulding flask clamping members are provided which are actuatable by a common power medium, said power medium first pressing all the clamping means or members against the moulding flask without causing any change in the position thereof, said clamping members being so distributed that as the power pressure increases they simultaneously, and with an identical aggregate contact pressure, press against the two sides of the part to be clamped, so that the position of the moulding flask is not affected.

In the accompanying drawing a typical embodiment of the invention is illustrated for the purpose of explaining the method. In the drawing:

Fig. 1 is a plan view, partly in section, of a jolt squeeze machine provided with mould stripping means made according to the present invention;

Fig. 2 is a side elevation, partly in section, of the machine shown in Fig. 1;

Fig. 3 shows a plan view of a modification of the clamping device; and

Fig. 4 shows a side elevation according to Fig. 3.

Figs. 1 and 2 show a jolt squeeze or vibration moulding machine of known type. The machine comprises a frame 1 with a jolt table 2 and a swivelling squeeze or presser plate 3. Incorporated in this moulding machine is the mould stripping apparatus according to the invention. In Fig. 1 the stripping apparatus is shown in full lines and in the position it occupies at the commencement of the stripping movement, and in dotted lines the position it occupies when swung aside. Fig. 2 shows the finished mould F lifted from the jolting table 2, swivelled aside through 180° and turned over through 180°. The moulding flask 5 placed on the pattern plate 4 contains the finished mould $F_1$ which must now be stripped from the pattern 7. The moulding flask 5 is provided on each of two opposite sides with a lateral extension piece or projection 8 having a pin guide $8a$. The projection 8 has two end faces 9 and 10 which serve as gripping or clamping surfaces. The gripping surfaces 9 and 10 may either be parallel or, if it is not desired to turn over the mould to be drawn, at an acute downward angle to one another. Affixed to the frame 1 is a vertical cylinder 12 in which a piston 13 is movable. At the upper end of the piston rod 14 a bracket or similar support means 17 is mounted on a cone 15 and secured by means of the nut 16. The bracket is provided with a vertical disk 18 on which the turnover arm 22, guided laterally by rings 19 and 20, is pivotally mounted. The turnover arm has two transverse brackets 23 and 24, each of which is provided with recesses in each of which a two-armed clamping lever, 27 and 28, respectively, is pivotally mounted on a pivot 25. The levers 27 are articulated, respectively, by one lever arm to the piston rods 30 and the levers 28 to the cylinders 31. The free lever arms of the levers 27 and 28 are designed as clamping jaws, of slightly convex profile if preferred, the purpose of which is to engage the faces 9 and 10 of the projections or abutment means 8 of the moulding flasks. The cylinders 31 are connected to the pressure medium supply arrangement 32 indicated in dotted lines. A locking bolt 34, which is forced by the spring 35, acting through the two-armed lever 36, into the recess 37 of the turnover arm 22, serves to lock the turnover arm in its horizontal position. This lock is released by pressure on the bolt 38.

The following is a description of the manner in which the apparatus depicted in Figs. 1 and 2 functions:

When the mould F is completed, the presser plate 3 is swung aside and the mould-draw mechanism swung in over the moulding flask 5 until it encounters a stop 6. By the operation of a control, not shown in the drawing, the compressed air contained in the cylinder 12 escapes, whereby the piston 13 with the piston rod 14, and therefore the entire mould-draw mechanism, lowers until the clamping levers 27 and 28 are located opposite the clamping surfaces 9 and 10 of the projections 8 of the moulding flask. By the operation of a control, not shown in the drawing, the cylinders 31 receive compressed air through the air pipes 32 indicated in dotted lines, which are connected to a common air supply compressor. Since both the cylinders 31 and the piston rods 30 are connected only to the levers 27 and 28, the pressure medium acts equally on both levers at each end of the flask, so that the levers are only able to exert a contra-acting pressure and thereby firmly grip the projection 8, whereby any laterally directed exercise of force, and therefore any displacement of the moulding flask from its position, is absolutely excluded. As soon as all the clamping levers encounter resistance, the pressure in the cylinders increases, with the result that the clamping levers are forced simultaneously, with full force, and from both sides against the projections or abutment means 8. Thereupon, by the continued operation of an air control, not shown in the drawing, the cylinder 12 likewise receives compressed air or pressure fluid, said air or fluid being throttled by the pin 12a at the initiation of the movement, and lifts the piston 13 and therefore, via the clamping mechanism, the frictionally gripped moulding flask 5. Vibrators 41 vibrate the mould platform 2 during the stripping movement. To ensure shockless limitation of the lifting or stripping stroke, an escape aperture 12b for the air to be expelled is provided in such a manner that said opening is covered, i. e. closed, by the rising piston 13 in the last part of the stroke, whereby the air present above the aperture 12b in the cylinder 12 acts as a cushion and brakes the lifting movement. On completion of the stroke, the mould-draw apparatus, together with the clamped mould F, is swung outward as shown by arrow 39 into the position 40. If the drag half of a mould is concerned, the turnover arm is freed by releasing the catch bolt 34 by means of applying pressure on the bolt 38, whereupon the turnover arm is turned over together with the clamped mould, as shown in Fig. 2. If the cope half of a mould is concerned, turning over is dispensed with. The turnover mechanism can therefore be omitted from moulding machines required to produce only cope halves of moulds. Whilst the suspended mould waits until an operative removes it, the moulder begins the production of a new mould F₁ by fitting a new moulding flask 5, charging the same with moulding sand, jolting and squeezing. Before the removal of the suspended, finished mould, the pressure medium is withdrawn from the cylinders 31 by opening a valve (not shown) so that the levers 27 and 28 release the moulding flask of the mould F, whereupon the latter may be removed either with the aid of hoisting tackle or by hand. The finished, suspended and possibly turned-over mould F may also be deposited on a runout table or other conveyer means by suitably lowering the piston 13 and slackening the grip of the clamping levers 27 and 28, or, if the work is the cope half of a mould, the same may be set down directly on to the drag half.

Fig. 3 and Fig. 4 show an embodiment of the clamping device according to the invention for drawing a mould half produced on a relatively large jolting table. Reposing on the jolting table 45 are the moulding flasks 46 of a mould half finished-formed therein. The undermost moulding flask 46a has on two opposite sides four machined gripping or clamping faces 47 in parallelly opposing pairs. The gripping faces or abutment means 47 may be parallel or may be at an acute downward angle to one another. The moulding flask is gripped by four pistons 48 having equal pressure areas and mounted in cylinders 49. The cylinders 49 are secured to the base or foundation 50. When the mould is finished, the jolting table 45 is lifted until the clamping faces 47 are opposite the pistons 48. Now all the cylinders 49 simultaneously receive compressed air through conduits 56 from a common supply source and the pistons move towards the machined clamping faces 47 of the undermost moulding flask part until they bear thereagainst. Since all the cylinders are connected to the same supply source of pressure medium, the pressure of the pressure medium cannot rise until all the pistons encounter resistance. It is therefore impossible, in this apparatus also, for one of the pistons to cause a shift of the moulding flask, since a rise in pressure does not take place until all the pistons are bearing against the flask. Needless to say, the aggregate pressure of the pistons on one side of the moulding flask must exactly correspond to the aggregate pressure on the other side. Since all the cylinders are equal in size and the compressed air supply source is symmetrically disposed, the pressure gradient in all feed pipes is equal. In order, in addition, to hold the moulding flask stationary after clamping, the friction of the pressure packings is sufficient. Whilst vibrators 55 vibrate the jolting table 45 and the pattern assembly, the jolting table 45 is lowered by the operation of a control, not shown in the drawing. After the lowering of the jolting table 45, the mould is suspended by pegs 53 through a suspension arrangement 54 from a crane, and when the pistons 48 have released the bottom moulding flask by expelling the compressed air from the cylinders 49, the mould, now suspended from the crane and already stripped from the pattern assembly, can be transported or moved away.

Figs. 1 to 4 show two embodiments of the application of the present invention. The inventive idea may, however, be used wherever the equipment provides at least a raising or lowering movement perpendicular to the plane of the mould. The clamping forces can be produced not only with compressed air, but with any desired fluids or gases under pressure. Purely mechanical clamping mechanisms are not to be recommended, as inaccuracies, which always occur under practical operating conditions, have the result that the sum of all the clamping forces does not decline to nil, and therefore, during the stripping movement, release supplementary frictional forces between the pattern assembly and the mould.

In the constructional design of the apparatus, care must be taken that all parts placed under stress by the stripping operation are so made as to be proof against torsional and/or bending stress.

As the detailed description of the embodiments shows, the invention increases the conformity to pattern of the moulds, facilitates stripping, and thereby provides the requisite conditions for a reliable automatic moulding machine.

Having thus described the invention, what is claimed as new and desired to be secured by Letters Patent, is:

1. A moulding apparatus having a moulding flask with at least two opposite side faces on said flask; comprising a vertical cylinder, a pressure actuated piston disposed for vertical movement within said vertical cylinder, means for moving said piston within said cylinder, a pair of gripping tongs carried by said piston, each of said gripping tongs including a pair of pressure fluid actuated levers, means for supplying pressure fluid to both said gripping tongs simultaneously, and a pair of projections disposed on said opposite side faces of said flask, respectively, each of said projections being provided with a pair of clamping surfaces substantially transversely disposed with respect to said opposite side faces of said flask, whereby upon supplying pressure fluid to said gripping tongs after completing a moulding operation all of said levers move in a direction parallel to said opposite side faces to contact respective clamping surfaces with equal pressure at positions spaced from said flask, upward movement of said piston within said vertical cylinder serving to raise said moulding flask while said gripping tongs hold said flask securely, thereby avoiding distortion of said flask.

2. An apparatus according to claim 1, wherein said clamping surfaces are disposed at right angles to said opposite side faces of said flask, said clamping surfaces and said gripping tongs being machined for positive secure contact therebetween.

3. An apparatus according to claim 2, wherein the clamping surfaces of each of said pairs are parallel to each other.

4. An apparatus according to claim 2, wherein the clamping surfaces of each of said pairs are at an acute angle to one another, converging towards a point below said projection.

5. An apparatus according to claim 1, each of said gripping tongs including cylinder means and piston means movable therein, said pressure fluid actuated levers being pivotally connected to said piston means and to said cylinder means, respectively, and a pair of brackets for each of said gripping tongs carried by said piston means, said levers being pivoted to said brackets, respectively, whereby upon supplying pressure fluid to said cylinder means of each of said gripping tongs, said levers swing about said brackets to contact said clamping surfaces.

6. An apparatus according to claim 5, including spring means for releasing said levers from contact with said clamping surfaces.

7. In an apparatus for withdrawing a flask containing a mould from a pattern supported on a moulding machine; a pair of projections disposed opposite and parallel to one another on said flask and each provided with two spaced machined clamping surfaces at the ends thereof, said projections extending longitudinally of said flask with the clamping surfaces extending transversely of said flask, a cylinder supported by said moulding machine and extending in a direction parallel to said flask, a piston carried in said cylinder for longitudinal displacement relative thereto, a pair of spaced brackets carried by said piston exteriorly of said cylinder, a pair of each of complementary spaced levers carried by each of said brackets, each of said levers having two ends and being pivotally secured intermediate said ends to its respective bracket, one end of each of said levers being provided with a pivot and the other end of each of said levers being machined to provide a gripping surface cooperable with a respective clamping surface, the gripping surfaces of each pair of levers facing each other, and a pair of commonly actuated extending means each connected to said pivots of each of said pairs of complementary levers, respectively, whereby upon actuation of said extending means all of said levers are pivoted simultaneously on their respective brackets so that said gripping surfaces of said complementary levers engage the spaced clamping surfaces of respective projections with equal pressure and without displacing said flask, and subsequent movement of said piston in one direction serves to withdraw said flask from said machine while said flask is held securely by said levers to thereby prevent distortion of the mould.

8. A system for gripping and withdrawing from a moulding machine a mould-containing moulding flask provided with spaced projections having respective pairs of substantially flat, clamping surfaces extending substantially perpendicularly from the walls of said flask; comprising bracket means movably supported on said machine, at least two pairs of spaced, cooperable levers, each of said levers having two ends and being pivotally supported intermediate its ends on said bracket means, one end of each of said levers being provided with a flat gripping surface, respective gripping surfaces of each lever pair facing in opposite directions and being operable to engage respective pairs of said clamping surfaces on said flask, fluid pressure-actuated means operatively connected to each of said lever pairs adjacent the other ends of each of said levers and operable to pivot said levers on said bracket means so as to cause said gripping surfaces to engage said clamping surfaces, respectively, with equal forces, whereby the forces exerted on each pair of clamping surfaces balance each other and said flask is gripped by said levers without distortion of said flask and said mould, and means operatively connected to said bracket means for moving the latter relative to said machine, whereby said flask and said mould gripped by said levers may be withdrawn from said machine preparatory to stripping of said flask from said mould.

9. A system according to claim 8, each of said fluid pressure-actuated means comprising a cylinder and a piston reciprocably disposed therein, each of said pistons being pivotally connected to one lever of each lever pair, and each of said cylinders being pivotally connected to the other lever of each lever pair.

10. A system according to claim 8, said means for moving said bracket means comprising a cylinder, a fluid pressure-operated piston reciprocably disposed within said cylinder, and a piston rod interconnecting said piston and said bracket means exteriorly of said cylinder.

11. A system according to claim 10, further including support means rotatably disposed on said piston rod and coaxially therewith, said bracket means being mounted on said support means for rotation therewith.

12. A system according to claim 11, further including pivot means disposed on said support means and substantially at right angles to said piston rod and said support means, said bracket means being rotatably mounted on said pivot means.

13. A system for gripping and withdrawing from a moulding machine a mould-containing moulding flask provided at opposite walls thereof with abutment means which are provided with pairs of opposed clamping surfaces; comprising bracket means supported on said machine and provided with movable gripping surfaces facing in opposite directions and conformed to the shape of the effective clamping surfaces, pressure-actuated means carried by said bracket means and operatively connected to said gripping surfaces so as to apply substantially equal forces to said gripping surfaces and to bring the latter into engagement with said clamping surfaces, whereby the forces exerted on each pair of said clamping surfaces balance each other to ensure gripping of said flask without distortion thereof and of said mould, and means operatively connected to said machine for moving said flask with said mould relative to said machine for stripping purposes.

References Cited in the file of this patent

UNITED STATES PATENTS

| 2,381,664 | Hansen | Aug. 7, 1945 |
| 2,623,252 | Miller | Dec. 30, 1952 |
| 2,640,234 | Bergami | June 2, 1953 |
| 2,651,087 | Fellows | Sept. 8, 1953 |
| 2,652,608 | Mezger | Sept. 22, 1953 |